United States Patent
Kobayashi et al.

(10) Patent No.: US 6,339,132 B1
(45) Date of Patent: Jan. 15, 2002

(54) PROCESS FOR REGENERATING UNREACTED VINYL CHLORIDE MONOMERS RECOVERED

(75) Inventors: Takashi Kobayashi; Fumiaki Adachi, both of Kamisu-machi; Fujio Sato, Hasaki-machi; Tadashi Amano, Kamisu-machi, all of (JP)

(73) Assignee: Shin-Etsu Chemical Co., Ltd., Tokyo (JP)

( * ) Notice: Subject to any disclaimer, the term of this patent is extended or adjusted under 35 U.S.C. 154(b) by 0 days.

(21) Appl. No.: 09/634,643

(22) Filed: Aug. 8, 2000

(30) Foreign Application Priority Data

Aug. 9, 1999 (JP) ............................................. 11-225597

(51) Int. Cl.$^7$ ................................................. C08F 2/18
(52) U.S. Cl. ............................. 526/68; 526/82; 526/291
(58) Field of Search ............................. 526/68, 291, 82

(56) References Cited

U.S. PATENT DOCUMENTS 3,807,138 A * 4/1974 Bellisio ........................ 55/32
5,403,899 A * 4/1995 Amano et al. ............... 526/214
5,414,086 A * 5/1995 Rittinger et al. ............ 544/315

* cited by examiner

Primary Examiner—David W. Wu
Assistant Examiner—William K Cheung
(74) Attorney, Agent, or Firm—Oblon, Spivak, McClelland, Maier & Neustadt, P.C.

(57) ABSTRACT

A process for regenerating unreacted vinyl chloride monomers is provided which has the step of compressing by means of an compressor an unreacted vinyl chloride monomer recovered from a process of vinyl chloride polymer production; compressing the same in contact with a lubricating oil fed into the compressor. In this process, the lubricating oil contains a polymerization inhibitor. Hence, even when this lubricating oil is circulated and reused as a lubricating oil after its separation from the unreacted vinyl chloride monomer, any vinyl chloride monomer remaining in the lubricating oil can effectively be kept from polymerizing in lubricating-oil circulation lines.

13 Claims, 1 Drawing Sheet

PROCESS FOR REGENERATING UNREACTED VINYL CHLORIDE MONOMERS RECOVERED

BACKGROUND OF THE INVENTION

1. Field of the Invention

This invention relates to a process for regenerating unreacted vinyl chloride monomers recovered from a process of vinyl chloride polymer production, which has a characteristic feature in the step of compressing the monomer.

2. Description of the Prior Art

Vinyl chloride polymers (inclusive of vinyl chloride type polymers and copolymers of vinyl chloride with other copolymerizable monomers) are conventionally produced by subjecting, in a polymerization vessel, vinyl chloride monomer or a mixture of vinyl chloride monomer and other copolymerizable monomer to polymerization reaction in the presence of a polymerization initiator by a process such as suspension polymerization or emulsion polymerization. After the polymerization is completed, a gaseous unreacted vinyl chloride monomer is recovered from the interior of the polymerization vessel (when the above monomer mixture is used, the unreacted vinyl chloride monomer is recovered in a special way), and then the vinyl chloride polymer is drawn out of the interior of the polymerization vessel. The vinyl chloride polymer drawn out of the interior of the polymerization vessel is made into products through the steps of dehydration and drying. Meanwhile, the gaseous unreacted vinyl chloride monomer recovered from the interior of the polymerization vessel (hereinafter often "recovered VCM or "recovered VCM gas") is rectified, and reused as a material for polymerization, vinyl chloride monomer.

Usually, the VCM gas recovered from the interior of the polymerization vessel is sent to a compressor and is compressed into a high-pressure gas, which is thereafter sent to a condenser, where it is liquefied into a crude liquefied recovered VCM. This crude liquefied recovered VCM is further sent to a hydro-extracting tank to separate water, and thereafter rectified in a rectifier. The product obtained is stored as a recovered VCM. The recovered VCM thus stored is thereafter reused as a material for polymerization, liquefied VCM.

In the step of compressing the recovered VCM, the compression of the recovered VCM fed brings about a rise of temperature of the recovered VCM and the resultant compressed recovered VCM to tend to cause polymerization. Accordingly, a method is employed in which the compressor is cooled and oil-lubricated (meant to be lubricated with a lubricating oil) at its driving portion and rubbing portions, and also, in order to keep the temperature of recovered VCM from rising, a lubricating oil is put and fed into the compressor in the step of compressing the recovered VCM, so as to be brought into contact with the recovered VCM to cool the recovered VCM and others.

According to this method, what is discharged out of the compressor is a mixture of the compressed recovered VCM gas and the lubricating oil. Accordingly, since the mixture discharged out of the compressor must be separated into the compressed recovered VCM gas and the lubricating oil, the mixture is sent to a gas-liquid separator and is separated there into the compressed recovered VCM gas and the lubricating oil. The compressed recovered VCM thus separated is sent to the condenser, and is finally reused as a material for polymerization, liquefied VCM, as stated previously.

Meanwhile, the lubricating oil separated is sent to a lubricating-oil tank, and is put into the compressor in the above compression step so as to be reused as the lubricating oil to be fed.

However, where the lubricating oil separated is fed into the compressor in the step of compressing the recovered VCM and circulated and reused for a long period of time as a circulating lubricating oil, the following difficulties may occur.

1) The vinyl chloride polymer forms on and adheres to the inner walls of piping which forms a circulation line of the lubricating oil or to the interior of a strainer provided in the course of the piping. In an extreme case, the piping clogs because of such adhesion of the vinyl chloride polymer.

2) The vinyl chloride polymer forms on and adheres to the inner walls of a lubricating-oil cooler provided in the course of the piping of the lubricating-oil circulation line, to cause a decrease in overall heat transfer coefficient (U-value) to lower the effect of cooling the lubricating oil circulating therethrough. Hence, there has been a problem that the lubricating-oil circulation line must frequently be disassembled and cleaned.

SUMMARY OF THE INVENTION

Accordingly, an object of the present invention is to provide a process for regenerating unreacted vinyl chloride monomers which process may hardly cause the polymerization of vinyl chloride in the lubricating-oil circulation line and so forth even when the lubricating oil fed into the compressor in the step of compressing the unreacted vinyl chloride monomer recovered is circulated and reused as a circulating lubricating oil over a long period of time.

The present inventors made extensive studies on the above problems the prior art has had. As the result, they have discovered that, even after the lubricating oil fed into the compressor and used therein has been separated from the recovered VCM by the gas-liquid separator and recovered, a recovered VCM involving a residue of a polymerization initiator stands dissolved therein in a very small quantity, and hence, when this lubricating oil is circulated to the compressor, the polymerization more tends to take place therein because of a high temperature accompanying the compression of the recovered VCM, so that, where the lubricating oil is circulated over a long period of time in such a state to continue its reuse, the vinyl chloride polymer is formed to cause the clogging or blocking of the strainer and the decrease in overall heat transfer coefficient of the cooler. Accordingly, the present inventors incorporated a polymerization inhibitor in the circulating lubricating oil, whereby the polymerization of vinyl chloride was effectively kept from occurring and the above difficulties were effectively restrainable even when the circulating lubricating oil is reused over a long period of time. On the basis of this finding, they have accomplished the present invention.

That is, the present invention provides a process for regenerating unreacted vinyl chloride monomers; the process having the steps of:

compressing in an compressor an unreacted vinyl chloride monomer recovered from a process of vinyl chloride polymer production, in contact with a lubricating oil fed into the compressor; and separating a mixture of a compressed unreacted vinyl chloride monomer and the lubricating oil, thus formed, into the compressed unreacted vinyl chloride monomer and the lubricating oil;

wherein the lubricating oil contains a polymerization inhibitor.

The lubricating oil thus separated from the mixture of the compressed unreacted vinyl chloride monomer and the lubricating oil can be circulated to the compressor so as to be reused.

The compressed unreacted vinyl chloride monomer separated by the above process from the mixture of the compressed unreacted vinyl chloride monomer and the lubricating oil may be purified so that it can be reused or can be stored as a liquefied vinyl chloride monomer so as to be reused. The purification of the compressed unreacted vinyl chloride monomer is performed as follows, for example. The compressed recovered vinyl chloride monomer separated from the mixture is sent to a condenser, where it is liquefied into a crude liquefied vinyl chloride monomer. This crude liquefied recovered vinyl chloride is further sent to a hydroextracting tank to separate water, and thereafter rectified in a rectifier. The vinyl chloride monomer thus rectified is stored in a liquefied state in a tank, and thereafter reused as a starting material for polymerization.

According to the present invention, the lubricating oil fed into the compressor in the step of compressing the unreacted vinyl chloride monomer contains a polymerization inhibitor, and hence the polymerization of vinyl chloride may hardly cause the polymerization of vinyl chloride in the lubricating-oil circulation line and others even when the lubricating oil is circulated and reused as a circulating lubricating oil over a long period of time. As the result, the clogging or blocking of the strainer, caused by the vinyl chloride polymer, and the decrease in overall heat transfer coefficient of the cooler can effectively be kept from occurring. Hence, the lubricating-oil circulation lines may be disassembled and cleaned much less times than ever.

DESCRIPTION OF THE PREFERRED EMBODIMENTS

Figure 1:
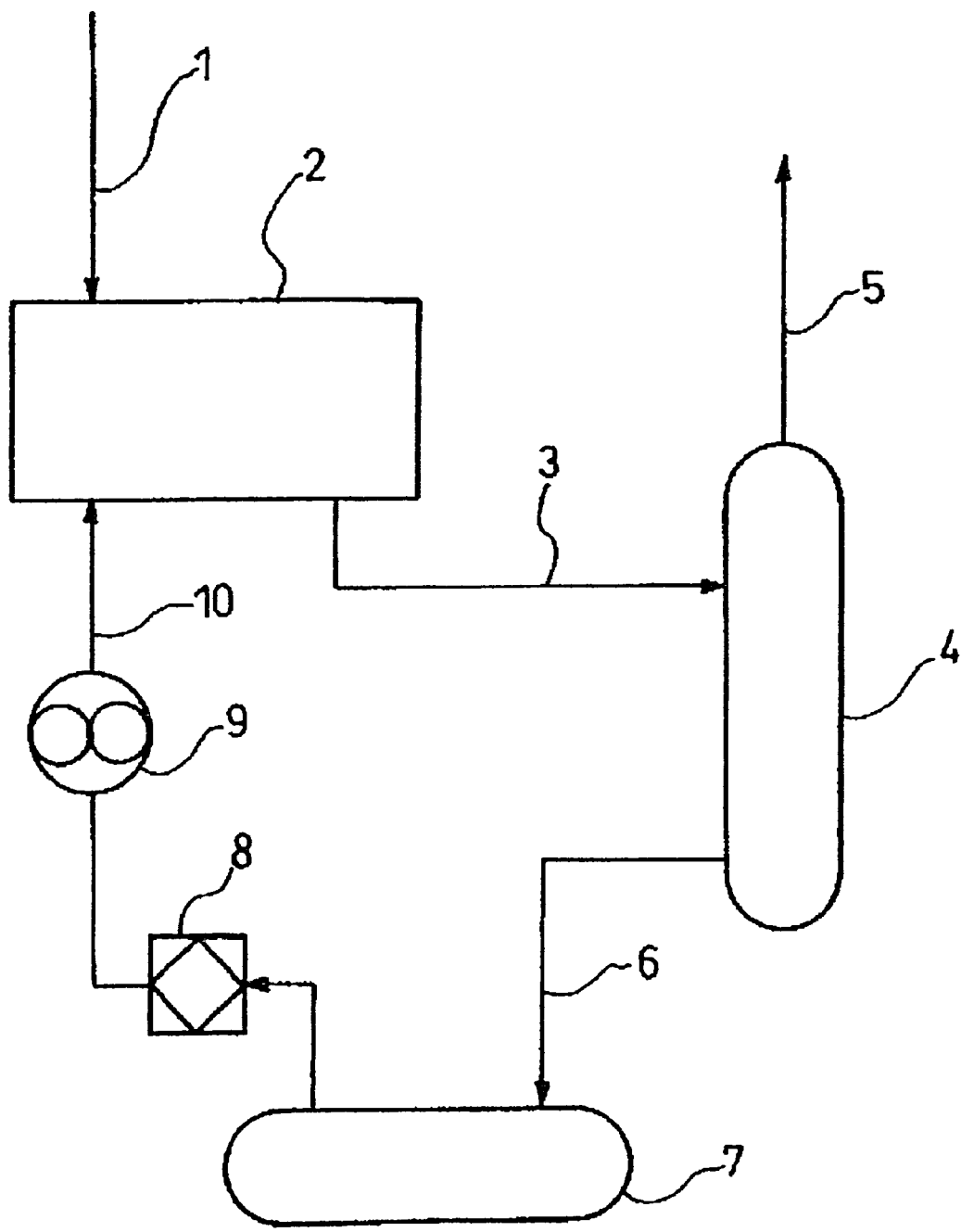
FIG. 1 is a flow sheet of an example of a regeneration process according to the present invention. In the drawing, reference numeral 1 denotes a feed-line piping for the recovered unreacted vinyl chloride monomer; 2, a compressor; 3, 6 and 10, lubricating-oil circulation lines; 4, a gas-liquid separator serving also as a lubricating oil storage tank; 7, a lubricating-oil cooler; 8, a lubricating-oil strainer; and 9, a feed pump.

In the process of the present invention, when the unreacted vinyl chloride monomer recovered from a process of vinyl chloride polymer production, stated specifically, from a polymerization vessel used in the production of vinyl chloride polymers is compressed by a compressor, a circulating lubricating oil containing a polymerization inhibitor is put and fed into the compressor, and the recovered unreacted vinyl chloride monomer is compressed while being brought into contact with the lubricating oil. As the lubricating oil, it is preferable to use a lubricating oil which has been separated and collected from a mixture of the compressed unreacted vinyl chloride monomer and the lubricating oil, discharged out of the compressor, and has been circulated into the compressor.

As the compressor used in the present invention, there are no particular limitations thereon as long as it has a structure wherein the recovered VCM gas is compressed while coming into contact with the lubricating oil fed into the compressor. For example, it may include a rotary screw-type compressor, a rotary Roots-type compressor, a rotary movable-vane-type compressor, a centrifugal radial-type compressor, a centrifugal turbo-type compressor, and a combination compressor employing a rotary system in the low-pressure part and a reciprocating system in the high-pressure part. In the present invention, among these compressors, it is preferable to use a rotary screw-type compressor. This rotary screw-type compressor is a compressor having a male rotor and a female rotor which have different numbers of teeth and are engageable with each other in a casing, where the space between teeth widely opened becomes small with rotation, so that the volume occupied in the rotor space is decreased with rotation to compress the gas.

The recovered VCM gas used in the present invention may be any gas as long as it is the one recovered from a process of vinyl chloride polymer production. For example, it may include those recovered from a process of producing vinyl chloride homopolymers, or copolymers of vinyl chloride with other copolymerizable monomers as exemplified by vinyl esters such as vinyl acetate and vinyl propionate, (meth)acrylates such as methyl (meth)acrylate and ethyl (meth)acrylate, olefins such as ethylene and propylene, maleic anhydride, acrylonitrile, styrene, and vinylidene chloride.

This recovered VCM gas is usually fed to the compressor under a low pressure to medium pressure of 0.01 to 3 $kg/cm^2G$ (gauge pressure) at normal temperature (20° C.), and compressed there. Compression pressure, which depends on the type of the compressor, may usually be about 5 to 7 $kg/cm^2G$.

The lubricating oil put and fed into the compressor has the action to keep the recovered VCM gas and the resultant compressed recovered VCM from undergoing temperature rise, upon its contact with the recovered VCM gas in the course where the gas is compressed, and at the same time the action to lubricate a compression zone of the compressor (having a compression zone and a casing which surrounds it) and also hermetically seal the interior of the compression zone and the boundary between the compression zone and the casing. It is suitable for such a lubricating oil to have a dynamic viscosity in the range of from 60 to 170 $mm^2/s$ at 40° C. as measured by the dynamic viscosity test method prescribed in JIS K2283. When expressed by ISO viscosity grades of ISO viscosity classification (JIS K2001), ISO VG68, ISO VG100 and ISO VG150 come under the lubricating oil having a dynamic viscosity in the above range.

The lubricating oil may be fed into the compressor in such a quantity that the recovered VCM gas discharged out of the compressor has a temperature ranging from 60 to 120° C. This is because, at a temperature lower than 60° C., the liquefaction of the recovered VCM is accelerated in the outlet piping for high-pressure recovered VCM gas, of the compressor to cause a difficulty such as return of liquid to the compressor. On the other hand, at a temperature higher than 120° C., there is a possibility of causing a difficulty that the formation of vinyl chloride polymer in the lubricating-oil circulation line is accelerated.

The lubricating oil used in the present invention must contain a polymerization inhibitor. As this polymerization inhibitor, one having a polymerization inhibitory action to the vinyl chloride monomer is used. Also, since it is added to the lubricating oil when used, an oil-soluble polymerization inhibitor may preferably be used in view of its compatibility with the lubricating oil and separability therefrom.

Such an oil-soluble polymerization inhibitor may be exemplified by phenol type inhibitors such as 2,6-di-t-butyl-p-cresol (BHT), 3-t-butyl-4-hydroxyanisole (3-BHA), 2-t-butyl-4-hydroxyanisole (2-BHA), 2,2'-methylenebis(4-methyl-6-t-butylphenol) (MBMBP), 2,2'-methylenebis(4-ethyl-6-t-butylphenol) (MBEBP), 4,4'-butylidenebis(3-methyl-6-t-butylphenol) (BBMBP), 4,4'-thiobis(3-methyl- 6-t-butylphenol) (SBMBP), styrenated phenol, styrenated p-cresol, 1,1,3-tris(2-methyl-4-hydroxy-5-t-butylphenyl) butane, tetrakis[methylene-3-(3',5'-di-t-butyl-4'-hydroxyphenyl)propionate]methane, octadecyl-3-(3,5-di-t-butyl-4-hydroxyphenylpropionate), 1,3,5-trimethyl-2,4,6-tris(3,5-di-t-butyl-4-hydroxybenzyl)benzene, 2,2'-dihydroxy-3,3'-di(a-methylcyclohexyl)-5,5'-dimethyldiphenylmethane, 4,4'-methylenebis(2,6-di-t-butylphenol), tris(3,5-di-t-butyl-4-hydroxyphenyl) isocyanurate, 1,3,5-tris(3',5'-di-t-butyl-4-hydroxybenzoyl) isocyanurate, bis[2-methyl-4-(3-n-alkylthiopropionyloxy)-5-t-butylphenyl]sulfide, 1-oxy-3-methyl-isopropylbenzene, 2,5-di-t-butylhydroquinone, 2,2'-methylenebis(4-methyl-6-nonylphenol), alkylated bisphenol, 2,5-di-t-amylhydroquinone, polybutylated bisphenol A, bisphenol A, 2,6-di-t-butyl-p-ethylphenol, 2,6-bis(2'-hydroxy-3-t-butyl-5'-methyl-benzyl)-4-methylphenol, 1,3,5-tris(4-t-butyl-3-hydroxy-2,6-dimethylbenzyl)isocyanurate, terephthaloyl-di (2,6-diemthyl-4-t-butyl-3-hydroxybenzyl sulfide, 2,6-di-t-butylphenol, 2,6-di-t-butyl-a-diemthylamino-p-cresol, 2,2'-methylene-bis(4-methyl-6-cyclohexylphenol), triethylene glycol bis[3-(3-t-butyl-5-methyl-4-hydroxyphenyl) propionate], hexamethylene glycol bis(3,5-di-t-butyl-4-hydroxyphenyl)propionate, 3,5-di-t-butyl-4-hydrxytoluene, 6-(4-hydroxy-3,5-di-t-butylaniline)-2,4-bis(octylthio)-1,3, 5-triazine, N,N'-hexamethylenebis (3,5-di-t-butyl-4-hydroxy-hydrocynamide), 3,5-di-t-butyl-4-hydroxybenzyl-diethyl phosphate, 2,4-diemthyl-6-t-butylphenol, 4,4'-methylenebis(2,6-di-t-butylphenol), 4,4'-thiobis(2-methyl-6-t-butylphenol), tris[β-(3,5-di-t-butyl-4-hydroxyphenyl) propionyl-oxyethyl]isocyanurate, 2,4,6-tributylphenol, bis [3, 3-bis (4'-hydroxy-3'-t-butylphenyl) -butyric acid]glycol ester, 4-hydroxymethyl-2,6-di-t-butylphenol, and bis(3-methyl-4-hydroxy-5-t-butylbenzyl) sulfide; amine type inhibitors such as N-phenyl-N'-isopropyl-p-phenylenediamine, N-phenyl-N'-(1,3-dimethylbutyl-p-phenylenediamine, N,N'-diphenyl-p-phenylenediamine, a 2,2,4-trimethyl-1,2-dihydroquinoline polymeric product, and diaryl-p-pehnylenediamine; sulfur type inhibitors such as dilauryl thiodipropionate, distearyl thiodipropionate, and 2-mercaptobenzimidazole; and phosphorus type inhibitors such as distearyl pentaerythritol diphosphite. Examples are by no means limited to these. These can be used singly or in combination of two or more. Of these polymerization inhibitors, triethylene glycol bis [3-(3-t-butyl-5-methyl-4-hydroxyphenyl)propionate], bisphenol A, 3,5-di-t-butyl-4-hydrxytoluene, 3-t-butyl-4-hydroxyanisole (3-BHA), 2,5-di-t-butylhydroquinone and octadecyl-3-(3,5-di-t-butyl-4-hydroxyphenylpropionate) are preferred.

The polymerization inhibitor may be contained in the lubricating oil in an amount ranging from 1 to 50,000 ppm, and more preferably from 100 to 10,000 ppm. If it is in a content more than 50,000 ppm, the lubricating oil may have a low fluidity and a low lubricity, and besides a high cost may result, bringing about an economical disadvantage. If it is in a content less than 1 ppm, the formation of vinyl chloride polymer can not well be restrained, and any effect of sufficiently preventing the vinyl chloride polymer from adhering to inner walls of lubricating-oil circulation-line piping and others may not be obtainable.

A preferred example of the process of the present invention will be described in detail with reference to FIG. 1.

FIG. 1 is a flow sheet of an example of a regeneration process according to the present invention. In the drawing, reference numeral 1 denotes a feed-line piping for feeding the recovered VCM to a compressor; 2, the compressor; 3, a feed-line piping for feeding the mixture of the compressed recovered VCM gas and the lubricating oil to a gas-liquid separator; 4, a gas-liquid separator which separates from the mixture the compressed recovered VCM gas and the lubricating oil, serving also as a storage tank of the lubricating oil thus separated; 5, a feed-line piping for feeding the compressed recovered VCM to a condenser; 6, a feed-line piping to a lubricating-oil cooler; 7, the lubricating-oil cooler; 8, a lubricating-oil strainer; 9, a feed pump; 10 a feed-line piping for feeding the lubricating oil to the compressor.

The VCM recovered from a polymerization vessel (not shown) used in a process of vinyl chloride polymer production is, under the low pressure to medium pressure as stated above, passed through the feed-line piping 1 and fed into the compressor 2, e.g., a rotary screw-type compressor. The recovered VCM kept under the low pressure to medium pressure, fed into the compressor 2, is introduced into the space defined between the male-and-female pair of rotors provided in the compressor, and is compressed into a high-pressure gas with a pressure of 5 to 7 kg/cm$^2$.

Meanwhile, in this course of compression, the circulating lubricating oil is passed through the feed-line piping 10, and put and fed into the space defined between the male-and-female pair of rotors in the compressor 2. Thus, the recovered VCM in the compressor 2 is compressed while coming into contact with the lubricating oil. On account of the feeding of and contact with the lubricating oil, the temperature of the compressed recovered VCM gas obtained is controlled within the range of from 60 to 120° C. At the same time, the rotors are lubricated and the space between the rotors and and the boundary between the rotors and the casing are hermetically sealed.

After the step of compression, a mixture of the compressed recovered VCM gas and the lubricating oil is discharged out of the compressor 2. The mixture is passed through the feed-line piping 3 and sent to the gas-liquid separator 4. At the upper part of the gas-liquid separator 4, the mixture is separated into the compressed recovered VCM gas and the lubricating oil. The compressed recovered VCM gas thus separated is passed through the feed-line piping 5 and sent to a condenser (not shown), where it is cooled and liquefied to become a crude liquefied recovered VCM. Meanwhile, the lubricating oil separated by the gas-liquid separator 4 is accumulated at the lower part of the gas-liquid separator 4.

Next, the lubricating oil accumulated at the lower part of the gas-liquid separator 4 is passed through the feed-line piping 6 and sent into the cooler 7, where the lubricating oil is cooled to a temperature usually ranging from 20 to 50° C.

The lubricating oil cooled by the cooler 7 is further passed through the feed-line piping 10 via the lubricating-oil strainer 8 by means of the pump 9, and circulated and fed into the compressor 2.

EXAMPLES

The present invention will be described below in greater detail by giving Examples and Comparative Example. The present invention is by no means limited to the following Examples.

Examples 1 to 4, Comparative Example 1

Using the compressor 2, the gas-liquid separator 4, the lubricating-oil cooler 7, the lubricating-oil strainer 8 and the pump 9 which were connected through the feed-line piping 1, 3, 6 or 10, the step of compressing recovered VCM gas, involving the step of circulating a lubricating oil, was carried out. As the compressor 2, a rotary screw-type compressor having a male-and-female pair of rotors was used (capacity: 1,000 Nm$^3$/h; intake pressure: 0.02 kg/cm$^2$G; discharge pressure: 6 kg/cm$^2$G; motor output: 160 kW); as the cooler 7, a lateral shell/tube type condenser (shell-side fluid: lubricating oil; maximum heat transfer coefficient: 800 kcal/m$^2$·h·° C.); and as the recovered VCM, low-pressure recovered VCM with an average pressure of 0.02 kg/cm$^2$G at normal temperature.

Before the above recovered VCM was compressed, the interiors of the compressor 2, gas-liquid separator 4, cooler 7 tubes, strainer 8 and pump 9 and the interiors of the feed-line pipings 3, 6 and 10 forming the lubricating-oil circulation line were cleaned by removing stains thoroughly. Each of lubricating oils A to E of the type as shown in Table 1 (those other than E contain a polymerization inhibitor) was put and fed into the feed-line piping 10, and then the lubricating oil was fed therethrough into the compressor 2 by means of the pump 9. At the same time, the recovered VCM was fed into the compressor 2 at about 1,000 Nm$^3$/h on the average to effect compression, and a mixture of the compressed recovered VCM gas and the lubricating oil was discharged out of the compressor. The mixture obtained was passed through the feed-line piping 3 and introduced into the gas-liquid separator 4, where the mixture was separated into compressed recovered VCM gas and the lubricating oil to obtain a compressed recovered VCM with an average pressure of 6 kg/cm$^2$G and an average temperature of 80° C.

The above step of compressing the recovered VCM, involving the step of circulating a lubricating oil, was continuously operated for 4 months. As the result, the temperature of the lubricating oil circulated and fed into the compressor 2 was maintained at 40° C., and the overall heat transfer coefficient in the cooler 7 at the time the step was begun to operate was 700 kcal/m$^2$·h·° C.

The number of times of strainer's blocking during the continuous operation and the overall heat transfer coefficient in the cooler immediately before the continuous operation was stopped were as shown in Table 1.

TABLE 1

| | Example 1 | Example 2 | Example 3 | Example 4 | Comparative Example 1 |
|---|---|---|---|---|---|
| Type of lubricating oil: | A | B | C | D | E |
| Overall heat transfer coefficient in the cooler immediately before the stop of continuous operation: (kcal/m$^2$.h.° C.) | 630 | 500 | 640 | 500 | 150 |
| Number of times of strainer's blocking: | 0 | 2 | 0 | 2 | 9 |

(Remarks)
A: 500 kg of a lubricating oil DAPHNE OIL 100 (trade name; available from Idemitsu Kosan Co., Ltd.; ISO viscosity grade: ISO VG100) to which 500 g of a polymerization inhibitor 3,5-di-t-butyl-4-hydroxytoluene was added.

B: 500 kg of the same lubricating oil as the above (DAPHNE OIL 100) to which 25 g of a polymerization inhibitor 3,5-di-t-butyl-4-hydroxytoluene was added.

C: 500 kg of the same lubricating oil as the above to which 500 g of a polymerization inhibitor bisphenol A was added.

D: 25 kg of the same lubricating oil as the above to which 100 g of a polymerization inhibitor bisphenol A was added.

E: 500 kg of the same lubricating oil as the above only.

What is claimed is:

1. A process for regenerating unreacted vinyl chloride monomers comprising:
   compressing in an compressor an unreacted vinyl chloride monomer recovered from a process of vinyl chloride polymer or copolymer production, in contact with a lubricating oil fed into the compressor;
   discharging a mixture of a compressed unreacted vinyl chloride monomer and the lubricating oil, thus formed, out of said compressor and separating said compressed unreacted vinyl chloride from said lubricating oil;
   wherein the lubricating oil contains a polymerization inhibitor.

2. The process of claim 1, wherein said lubricating oil separated from the mixture of the compressed unreacted vinyl chloride monomer and the lubricating oil is circulated to the compressor so as to be reused.

3. The process of claim 1, wherein said compressed unreacted vinyl chloride monomer separated from the mixture of the compressed unreacted vinyl chloride monomer and the lubricating oil is purified so that it is reused, or stored as a liquefied vinyl chloride monomer so as to be reused.

4. The process of claim 1, wherein said compressor is selected from the group consisting of a rotary screw-type compressor, a rotary Roots-type compressor, a rotary movable-vane-type compressor, a centrifugal radial-type compressor, a centrifugal turbo-type compressor, and a combination compressor employing a rotary system in the low-pressure part and a reciprocating system in the high-pressure part.

5. The process of claim 1, wherein said recovered unreacted vinyl chloride monomer is fed into said compressor under a pressure of 0.01 to 3 kg/cm$^2$ (gauge pressure) at normal temperature.

6. The process of claim 1, wherein said recovered unreacted vinyl chloride monomer is compressed in said compressor under a pressure of about 5 to 7 kg/cm$^2$ (gauge pressure).

7. The process of claim 1 wherein said lubricating oil fed into the compressor has a dynamic viscosity in the range of from 60 to 170 mm$^2$/s at 40° C. as measured by the dynamic viscosity test method prescribed in JIS K 2283.

8. The process of claim 1, wherein said lubricating oil is fed into the compressor in such a quantity that the recovered vinyl chloride monomer gas discharged out of the compressor has a temperature ranging from 60 to 120° C.

9. The process of claim 1, wherein said polymerization inhibitor is an oil-soluble polymerization inhibitor.

10. The process of claim 9, wherein said oil-soluble polymerization inhibitor is selected from the group consisting of 2,6-di-t-butyl-p-cresol, 3-t-butyl-4-hydroxyanisole, 2-t-butyl-4-hydroxyanisole, 2,2'-methylenebis(4-methyl-6-t-butylphenol), 2,2'-methylenebis(4-ethyl-6-t-butylphenol), 4,4'-butylidenebis(3-methyl-6-t-butylphenol), phenol, styrenated p-cresol, 1,1,3-tris(2-methyl-4-hydroxy-5-t-butylphenyl)butane, tetrakis[methylene-3-(3',5'-di-t-butyl-4'-hydroxyphenyl)propionate]methane, octadecyl-3-(3,5-dit-butyl-4-hydroxyphenylpropionate), 1,3,5-trimethyl-2,4,6-tris(3,5-di-t-butyl-4-hydroxybenzyl)benzene, 2,2'-dihydroxy-3,3'-di(a-methylcyclohexyl)-5,5'-dimethyldiphenylmethane, 4,4'-methylenebis(2,6-di-t-butylphenol), tris(3,5-di-t-butyl-4-hydroxyphenyl) isocyanurate, 1,3,5-tris(3',5'-di-t-butyl-4-hydroxybenzoyl) isocyanurate, bis[2-methyl-4-(3-n-alkylthiopropionyloxy)-5-t-butylphenyl]sulfide, 1-oxy-3-methyl-isopropylbenzene, 2,5-di-t-butylhydroquinone, 2,2'-methylenebis(4-methyl-6-nonylphenol), alkylated bisphenol, 2,5-di-t-amylhydroquinone, polybutylated bisphenol A, bisphenol A, 2,6-di-t-butyl-p-ethylphenol, dimethyl-4-t-butyl-3-hydroxybenzyl sulfide, 2,6-di-t-butylphenol, 2,6-di-t-butyl-a-dimethylamino-p-cresol, 2,2'-methylene-bis(4-methyl-6-cyclohexylphenol), triethylene glycol bis [3-(3-t-butyl-5-methyl-4-hydroxyphenyl)propionate], hexamethylene glycol bis(3,5-di-t-butyl-4-hydroxyphenyl)propionate, 3,5-di-t-butyl-4-hydroxytobuene, 6-(4-hydroxy-3,5-di-t-butylaniline)-2,4-bis(octylthio)-1,3,5-triazine, N,N'-hexamethylenebis(3,5-di-t-butyl-4-hydroxy-hydrocyanamide), 3,5-di-t-butyl-4-hydroxybenzyl-diethyl phosphate, 2,4-dimethyl-6-t-butylphenol, 4,4'-methylenebis (2,6-di-t-butylphenol), 4,4'-thiobis(2-methyl-6-t-butylphenol), tris[β-(3,5-di-t-butyl-4-hydroxyphenyl) propionyl-oxyethyl]isocyanurate, 2,4,6-tributylphenol, bis [3,3-bis(4'-hydroxy-3'-t-butylphenyl)-butyric acid]glycol ester, 4-hydroxymethyl-2,6-di-t-butylphenol, and bis(3-methyl-4-hydroxy-5-t-butylbenzyl) sulfide; N-phenyl-N'-isopropyl-p-phenylenediamine, N-phenyl-N'-(1,3-dimethylbutyl-p-phenylenediamine, N,N'-diphenyl-p-phenylenediamine, a 2,2,4-trimethyl-1,2-dihydroquinoline polymer, diaryl-p-phenylenediamine; dilauryl thiodipropionate, distearyl thiodipropionate, 2-mercaptobenzimidazole and distearyl pentaerythritol diphosphite.

11. The process of claim 9, wherein said oil-soluble polymerization inhibitor is selected from the group consisting of triethylene glycol bis[3-(3-t-butyl-5-methyl-4-hydroxyphenyl)propionate], bisphenol A, 3,5-di-t-butyl-4-hydrxytoluene, 3-t-butyl-4-hydroxyanisole, 2,5-di-t-butylhydroquinone and octadecyl-3-(3,5-di-t-butyl-4-hydroxyphenylpropionate).

12. The process of claim 1, wherein said polymerization inhibitor is contained in the lubricating oil in an amount ranging from 1 to 50,000 ppm.

13. The process of claim 1, wherein said polymerization inhibitor is contained in the lubricating oil in an amount ranging from 100 to 10,000 ppm.

* * * * *